United States Patent [19]

Mallicoat

[11] Patent Number: 5,248,856

[45] Date of Patent: Sep. 28, 1993

[54] CODE-BASED, ELECTROMAGNETIC-FIELD-RESPONSIVE GRAPHIC DATA-ACQUISITION SYSTEM

[75] Inventor: Samuel W. Mallicoat, Portland, Oreg.

[73] Assignee: Microfield Graphics, Inc., Beaverton, Oreg.

[21] Appl. No.: 958,076

[22] Filed: Oct. 7, 1992

[51] Int. Cl.⁵ ........................................... G08C 21/00
[52] U.S. Cl. .................................................. 178/18
[58] Field of Search ............................ 178/18, 19, 20; 340/706, 707

[56]  References Cited
U.S. PATENT DOCUMENTS

| | | |
|---|---|---|
| Re. 33,936 | 5/1992 | Miyamori et al. . |
| 3,184,847 | 5/1965 | Rosen . |
| 3,457,646 | 7/1969 | Schwemin . |
| 3,553,680 | 1/1971 | Cooreman . |
| 3,613,066 | 10/1971 | Cooreman . |
| 3,775,560 | 11/1978 | Ebeling et al. . |
| 3,898,445 | 8/1975 | MacLeod et al. . |
| 4,104,617 | 8/1978 | Bean et al. . |
| 4,125,743 | 11/1978 | O'Boyle et al. . |
| 4,558,313 | 12/1985 | Garwin et al. . |
| 4,670,751 | 6/1987 | Enokido et al. . |
| 4,688,900 | 8/1987 | Doane et al. . |
| 4,711,977 | 12/1987 | Miyamori et al. . |
| 4,777,329 | 10/1988 | Mallicoat . |
| 4,811,004 | 3/1989 | Person et al. ..................... 178/18 |
| 4,832,144 | 5/1989 | Murakami et al. . |
| 4,901,073 | 2/1990 | Kibrick . |
| 4,938,570 | 7/1990 | Majima et al. . |
| 4,944,576 | 7/1990 | Lacker et al. . |
| 4,994,204 | 2/1991 | Doane et al. . |
| 5,009,044 | 4/1991 | Baughman et al. . |
| 5,015,057 | 5/1991 | Rumbaugh et al. . |
| 5,023,408 | 6/1991 | Murakami et al. . |
| 5,076,690 | 12/1991 | deVos et al. . |
| 5,096,282 | 3/1992 | Margerum et al. . |

Primary Examiner—Stafford Schreyer
Attorney, Agent, or Firm—Kolisch, Hartwell, Dickinson, McCormack & Heuser

[57]  ABSTRACT

An electromagnetic-field-responsive (preferably optical), code-based, graphic data-acquisition system for tracking the operational status of a mobile write-effective component (stylus, eraser, etc.) in relation to a defined writing-surface area. The preferred embodiment features an active optical structure which is disposed adjacent the writing-surface area for creating, by scanning, a defined zone of optical radiation, optically reactive, retroreflective code structure which is joined to the mobile component and which is capable of reacting (reflecting the same) to radiation within the zone when the code structure intersects the zone, a reaction monitoring structure for monitoring the reaction behavior of the code structure and for producing a related response, and interpretation structure which acquires that response and determines therefrom the desired operational-status-tracking information. Modification to this preferred structure are also illustrated and discussed.

28 Claims, 3 Drawing Sheets

CODE-BASED, ELECTROMAGNETIC-FIELD-RESPONSIVE GRAPHIC DATA-ACQUISITION SYSTEM

TECHNICAL FIELD

This invention relates to a code-based, electromagnetic-field-responsive (and preferably optically responsive), one-to-one, graphic data-acquisition system for tracking, in relation to a defined writing-surface area, the operational status (position, character, inclination etc.) of a mobile, write-effective component, such as a writing stylus (pen, marker) or eraser, in the system.

BACKGROUND AND SUMMARY OF THE INVENTION

Early notions of digitizing the activities at what might be thought of as an "electronic blackboard" date at least to the mid-1960s, at which time emphasis was placed on the communication of graphical data, specifically handwriting and sketches, from one location to another. U.S. Pat. No. 3,706,850 discloses a system related to such activity.

At about the same time, interest was strong afoot in digitizing the activity on a tabletop—for example for the entry of line drawings into a computer. Systems involving this interest are collectively known as graphic tablets, and U.S. Pat. No. 3,838,212 is an early example of development matters in this area.

By the mid-1980s, a third kind of a product group developed to address the need for creating a local hard copy of material written and sketched onto a dry-erase, so-called whiteboard. This generic group of systems, known collectively as electronic copyboards (ECBs), relates fundamentally to stand-alone devices that have much in common with well known reducing photocopiers.

Each of these devices attempts, in its own right so-to-speak, to provide the user with a natural communication metaphor—with familiar writing tools. In the cases of the electronic blackboard and the electronic copyboard, the metaphor is a wall-mounted surface meant for mass viewing, with marking or writing accomplished by colored markers, and erasing occurring by wiping with an eraser. In the case of the graphic tablet, the metaphor is a desktop slate and stylus meant for individual use.

Those skilled in the art recognize that both electronic blackboards and electronic copyboards typically require special surfaces and are relatively expensive. Further, they do not readily support the use of color presentations, and the typical electronic copyboard cannot communicate real-time transitional information—i.e. it must batch-transmit (like a facsimile) an entire sheet, or page, of information at a time.

Other systems and approaches generally in this line of technical art are illustrated, for example, in U.S. Pat. Nos. 4,558,313, 4,777,329 and 5,023,408. The '313 patent focuses on an indicator-to-data processing interface which employs a light source and a background reflector as constituents in a system to monitor occlusion of light occurring from the positioning and movement of a manually moved indicator over a surface. The '329 patent, which is based upon on my own prior line of development in this field, addresses attention to a graphic input system which employs ultrasound to monitor the position of a mobile element over a surface. The '408 patent describes an electronic blackboard including a sensing tablet which senses the position of a "writing tool" that includes a tuned circuit having a predetermined resonant frequency.

All of these various approaches in the prior art in this area offer, in their own respective ways, operational advantages in certain applications, but nevertheless also have some common, as well as differentiated, deficiencies which are correctively addressed by the system of the present invention. For example, prior art systems of the type outlined above are relatively complicated and costly (as mentioned). They are not necessarily readily retrofittable, for example, to a wide variety of writing-surface structures which are already in hundreds of thousands of users' possessions. Further, prior art systems are not particularly adapted to yield information about the condition of a writing stylus or an eraser (write-effective component) much beyond its position or station over a writing surface. Many systems, as already indicated, cannot communicate changing, real-time positioning of such a component. Nor are known prior art systems adapted to handle more sophisticated informational issues, such as (1) differentiated writing-line widths which may result from differentiated angulation of a writing stylus, or (2) parallax under similar circumstances, or (3) the width of an eraser swath under circumstances where an eraser's configuration is such that it has different effective erasure-widths from different angular points of view.

Accordingly, and in the setting just described, a general object of the present invention is to provide a novel graphic data-acquisition system which offers not only the various features and advantages made available by prior art, generically-related systems, but which also addresses effectively the various performance, cost, simplicity and sophistication, etc., issues just briefly mentioned.

Proposed by the present invention, with these considerations in mind, is a code-based electromagnetic-field-responsive, and preferably optically (or near optically) responsive, one-to-one, graphic data-acquisition system which employs active transceiver structure (a pair or more preferably), including a scanning light-beam source and a light-reflection (or light-retroreflection) monitoring structure (1) to create a zone of scanned or swept radiation extending closely over a defined writing-surface area, and (2) to monitor reflections (or retroreflections) of such radiation from such an area, all in cooperation with a passive write-effective component, such as a writing stylus (pen, marker) or eraser, which is equipped with code structure, such as a bar code structure, that reflects (retroreflects), or otherwise interacts responsively to, radiation created (by scanning) over the writing-surface area. As mentioned, the system of the invention preferably operates in the optical, or near-optical, portion of the electromagnetic spectrum. Thus, in the preferred embodiment of the invention described herein, two transceiver structures are employed at spaced stations, with each such structure including a light source in the form of a laser operating generally in the optical, or perhaps more precisely in the near-optical, portion of the electromagnetic spectrum, and specifically, at a preferred wavelength of 780-nanometers. The system is referred to as a one-to-one system since communication takes place directly between a transceiver structure and a write-effective component moved over the writing-surface area.

By employing passive, radiation-responsive code structure on a component that moves over a writing surface to create or remove images, the system achieves remarkable simplicity. Further, by utilizing a code structure associated with such a component, a great deal of information, quite beyond simply that relating to the position of the component relative to the writing-surface area, can be acquired. For example, one can distinguish immediately whether the component is a writing implement or an erasing implement, can determine the nature or character of written line width or eraser swath, can detect, for example, specific color in the instance of a colored writing instrument being used, and also with respect to a writing instrument, can provide data regarding inclination relative to the writing-surface area, and hence any related changes in written line width, and in parallax. A data stream generated from the monitoring structure which forms part of each transceiver structure in the system can be used in a variety of ways, such as for example, to feed information into the memory of a digital computer, and/or to feed information for transmission, for example over a voice-grade telephone line, to remote stations for "live" presentation of "writing activity" occurring on the writing-surface area in the system, etc.

A modified form of the system utilizes a "nonmarking" stylus and a "nonerasing" eraser whose travel paths over the associated writing-surface area are followed to effect back-projection illumination or deillumination of a conventional translucent screen which forms the writing-surface area.

The system of the invention employs conventional triangulation, derived from the use of at least two, spaced transceiver-structure stations, to track the position and motion of a writer or eraser, and the components of the system are readily retrofittable, at relatively low cost, to a wide variety of otherwise conventional writing-surface structures, such as so-called dry-erase whiteboards.

Various other features and advantages which are attained and offered by the invention will become more fully apparent as the description which now follows is read in conjunction with the accompanying drawings.

DETAILED DESCRIPTION OF, AND BEST MODE FOR CARRYING OUT, THE INVENTION

Figure 1:
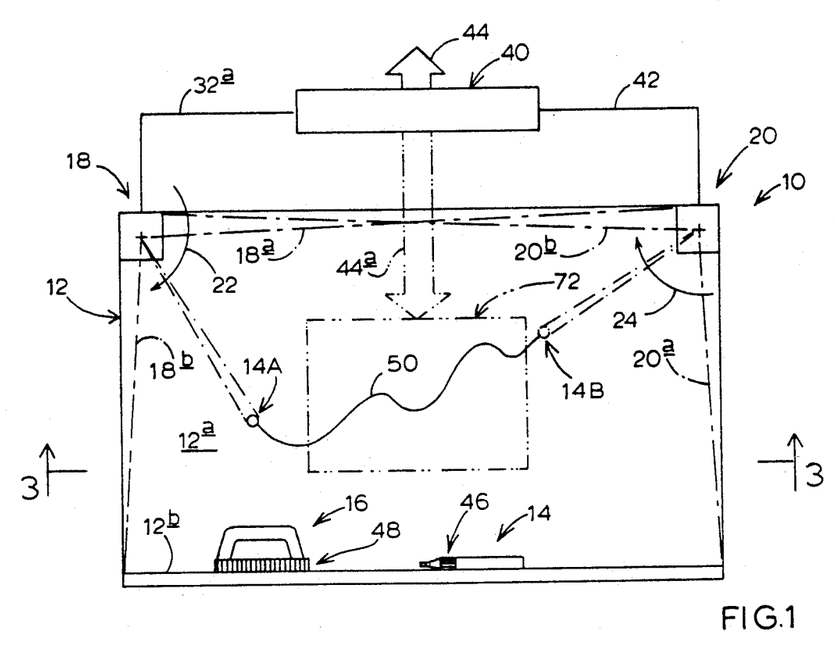
FIG. 1 is a front elevation, in schematic form, illustrating, as will be explained below, a preferred embodiment, and one modification, of a graphic data-acquisition system constructed in accordance with the present invention, all illustrated in connection with the drawing (writing) of a single line.
Figure 2:
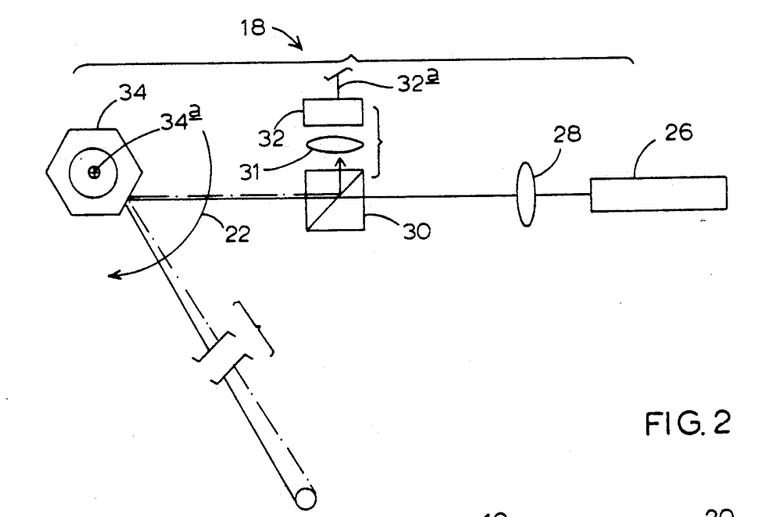
FIG. 2 is an enlarged, schematic detail of one of two transceiver structures employed in the system of FIG. 1.
Figure 3:
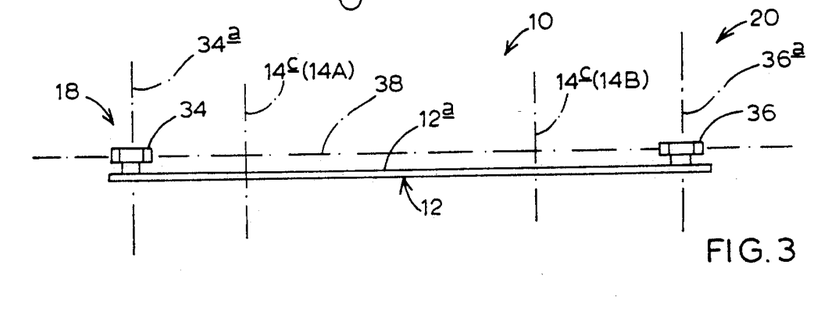
FIG. 3 is a schematic view taken generally along the line 3—3 in FIG. 1.

Turning attention now to the drawings, and referring first of all to FIGS. 1–3, inclusive, indicated generally at 10 is a one-to-one, graphic data-acquisition system constructed in accordance with a preferred embodiment of the present invention. System 10 is mounted and positioned for use with respect to the writing-surface area 12a of an upright, otherwise conventional, dry-erase whiteboard which includes an implement-support ledge 12b on which rest two mobile, write-effective components, including a pen (stylus), or writing instrumentality, 14, and an eraser, or deleting or erasing instrumentality, 16, each constructed in accordance with the invention and provided as components in system 10. Further included in the system, and located at two, spaced stations adjacent the upper corners of board 12, are two, active transceiver structures 18, 20 which are alike in construction, and which are of conventional and readily commercially available design. As will be explained, structure 18 functions to create, over and closely adjacent writing-surface area 12a, a pattern of scanned optical radiation that lies within and partially defines a scanning zone which is partially bounded by dash-dot lines 18a, 18b. Scanning occurs by structure 18 in successive, clockwise sweeps in the rotary direction of arrow 22, and as will be explained, certain structure within transceiver structure 18 responds to any return-response radiation that returns from a reflecting or retroreflecting object within the scan zone. In this regard, I will later describe usable system modifications wherein "response" activity does not depend upon reflection or retroreflection. Structure 20 operates (independently) in a similar fashion to contribute to the mentioned scanning zone by creating a pattern of scanned light lying between dash-dot lines 20a, 20b. The scanning rate associated with transceiver structure 20 is the same as that associated with structure 18, and the scan direction is also clockwise (as viewed in the FIG. 1) in the direction of arrow 24. The scan rate associated with each of the two transceiver structures herein is 1000-scans-per-second.

FIG. 2 illustrates the conventional make-up, for example, of transceiver structure 18, and this structure is seen to include a laser 26, a focusing lens 28 which, in cooperation with the laser, creates a narrow, collimated beam, a dual-prism beam splitter 30, a lens 31, a photodetector 32 and a faceted, polygonal, rotating mirror 34 which is driven by a suitable, brushless, DC motor (not shown), and which rotates about axis 34a in the direction of previously mentioned arrow 22. Laser 26, lens 28, beam splitter 30 and mirror 34 are referred to herein collectively as scanning light-beam-source structure, or as active optical structure. Photodetector 32, lens 31, along with beam splitter 30 and mirror 34, are referred to herein collectively as a light-reflection (or as light-retroreflection) monitoring structure, and also as reaction monitoring structure.

Laser 26 operates at the wavelength indicated earlier, and produces a beam of light which passes through lens 28 and beam splitter 30 to strike mirror 34 whose rotation causes this beam to scan in successive (1000-times-per-second) sweeps in parallel, closely spaced fashion over writing-surface area 12a. In the preferred system embodiment now being described, any such light which is reflected from the scanning zone adjacent the writing-surface area, back toward mirror 34, is note instantly by way of its striking beam splitter 30, and at least partially deflecting, as indicated, toward photodetector 32. The photodetector produces, on an output cable indicated generally at 32a, a signal which is directly related to the received, reflected radiation.

Transceiver structure 20 is substantially the same in construction and operation as structure 18.

The highly simplified view which is presented in FIG. 3 illustrates whiteboard 12 and writing-surface area 12a, with mirror 34 and transceiver structure 18 shown at the left side of the figure, and with a mirror 36 which, in transceiver structure 20 is the counterpart to mirror 34, shown adjacent the right side of FIG. 3. Mirror 36 rotates in the direction of previously mentioned arrow 24 about an axis 36a. The operations of these two mirrors with respect to their associated lasers creates the previously mentioned scanning zone, indicated now generally at 38 in FIG. 3, which zone closely overlies (in a parallel manner) writing-surface area 12a. Zone 38 is bounded in system 10 by lines 18a, 18b, 20a, 20b, and by ledge 12b.

Continuing with a description generally of what is included in system 10, and returning attention specifically to FIG. 1, included in the system, preferably, is a digital signal processor, or interpretation structure, 40 which receives, from transceiver structures 18, 20, signals relating to detected reflections. These signals are fed to the processor via previously mentioned cable 32a which extends from transceiver structure 18, and by a cable 42 which extends in like fashion from the companion photodetector (not shown) that forms part of transceiver structure 20. Processor 40 is coupled to an output bus 44 which can be used selectively and operatively as a "feed" connection to a remote terminal/viewing station, a telephone data-transmission line, etc.

Completing a general description of system 10, each of the two write-effective components—pen 14 and eraser 16—is equipped preferably with light-retroreflecting (reflecting) bar codes 46, 48, respectively, which are also referred to herein as optically reactive, selected-characteristic-identifying code structures.

Figure 4:
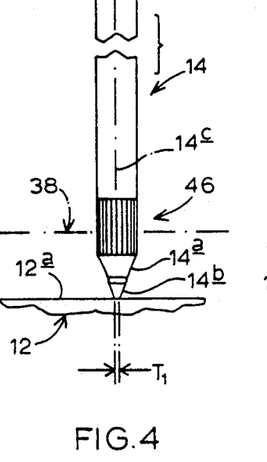
FIG. 4 (second plate of drawings) is an enlarged, fragmentary detail illustrating a writing stylus, and use thereof, in the system of FIG. 1, with the long axis of the stylus shown disposed substantially normal to the plane of a writing-surface area in the system.

Taking a look now specifically at FIGS. 4–7, inclusive (plate two in the drawings), pen 14 herein includes an elongate cylindrical body having a writing-tip end 14a adjacent which is provided a writing tip 14b. Tip 14b might have any selected shape, and herein is shown with a generally rounded, conical shape which is capable, depending upon the angular disposition employed for the pen during a writing operation, to create, on writing-surface area 12a, line widths which are different. In FIG. 4, pen 14 is shown in a writing condition with its long axis 14c disposed substantially normal to writing-surface area 12a. In this condition, writing motion of the pen over the writing-surface area creates a line having a nominal width indicated at $T_1$.

Code structure 46 herein takes the form of a band distributed around the body of the pen adjacent end 14a, which band includes an organized bar-code arrangement of longitudinally extending, differentiated retroreflecting regions, such as "strong" retroreflecting regions 46a (see FIG. 6) interspersed with substantially non-retroreflecting regions, such as regions 46b. Regions 46a, 46b are distributed circumferentially about pen 14 in what might be thought of as a linear disposition (circumferentially speaking) with each of these regions, relative to axis 14c, subtending substantially the same angle. FIG. 7, which shows what might be thought of as a developed or laid out view of a fragment of code structure 46, illustrates the "uniform angular width" nature of interspersed regions 46a, 46b. This, as should be appreciated, is but one of an infinite variety of angular-disposition patterns which may be chosen for a code structure.

Code structure 46 is positioned on pen 14 at a location whereby, with the pen in the disposition shown for it in FIG. 4 relative to writing-surface area 12a, the code structure optically "intersects" scanning zone 38. In a broad sense, this interaction is also referred to herein as a field-electromagnetic engagement with zone 38. As depicted in FIG. 4, the bar regions in code structure 46, under these circumstances, substantially symmetrically "straddle" (in a vertical sense) the "plane" of scanning zone 38. The lengths of these bar regions are chosen herein to create a situation whereby, under circumstances with pen 14 tilted at a selected, pre-planned writing inclination which is the maximum expected writing inclination relative to writing-surface area 12a (see particularly angle $\alpha$ in FIG. 5), the bar regions will still optically intersect the plane of scanning zone 38.

Figure 5:
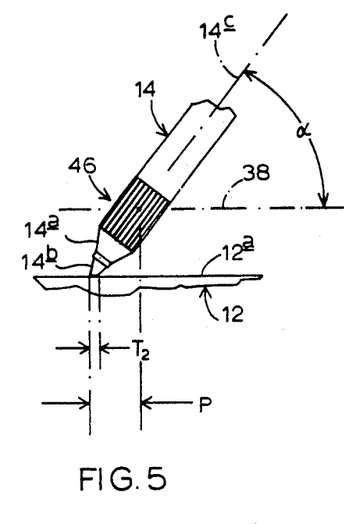
FIG. 5 is similar to FIG. 4, except that it shows the writing stylus disposed with its long axis at an angle $\alpha$ (in the plane of FIG. 5) relative to the plane of the writing-surface area.

Deflecting attention for a moment to FIG. 5, and considering the situation there illustrated with pen 14 tilted at angle $\alpha$ in the plane of FIG. 5 relative to writing-surface area 12a, two interesting matters should be noted. First, and because of the nature and configuration of writing tip 14b, the nominal line width which will be written by the pen under these circumstances is greater than that illustrated in FIG. 4, and is shown in FIG. 5 as $T_2$. Further, there is a lateral, vertical projection-displacement on and along surface 12a between the writing extremity of tip 14b and the point of intersection of the plane of zone 38 and axis 14c, and this displacement represents a parallax condition which is indicated in FIG. 5 at P. More about these changed conditions will be said shortly.

Figure 8:
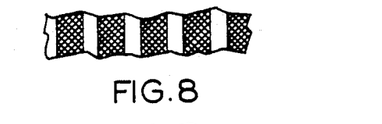
FIGS. 8, 9 and 10 are somewhat like FIG. 7, and illustrate several different modifications of a bar code, or code structure, with FIGS. 8 and 9 illustrating what are referred to herein as unilinearly distributed codes, and with FIG. 10 illustrating what is referred to herein as a bilinearly distributed code.
Figure 9:
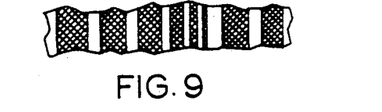
Figure 10:
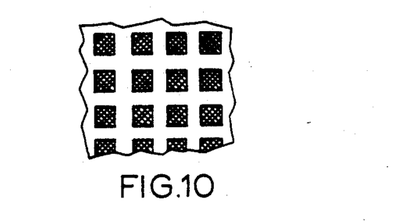

According to the invention, the code structure associated with pen 14 is chosen to be specific to that component. Herein, it specifically identifies the component as a writing pen, and further provides information about the writing "color" of the pen, and about the writing-tip configuration or topography. The creation of such a specific code for a given component is well within the skill of those having knowledge in the art, and thus can readily be tailored (without any detailed elaboration herein) to be unique for each given type of write-effective component employed in the system of the invention. For example, FIGS. 8, 9 and 10 show three different kinds of code structures which are among the infinite variety available to the implementor of the system. FIG. 8 shows a linearally distributed bar code in which retroreflecting and non-retroreflecting elongate bands are linearly distributed, with the retroreflecting regions each subtending a like angle relative to a supporting circumferential or cylindrical surface, and with each non-retroreflecting band subtending a like but smaller angle. FIG. 9 illustrates a linearly distributed bar code which is characterized by angular variance, in the sense that, as one progresses around the supporting cylindrical surface, adjacent retroreflecting bar regions subtend different angles, and the same is true with respect to interleaved, non-retroreflecting bar regions. This kind of a code is particularly useful in enabling the system to detect the rotational angular position of a write-effective component over surface 12a, as such component is viewed from the point of view of FIG. 1. FIG. 10 illustrates a bilinearly (along two axes) distributed code structure in which patches of retroreflecting material are interleaved by ways and alleys of non-retroreflecting material. These illustrations, and stressing a point which has already been made herein, are but a very few representations of the differentiated ways in which code structures can be constructed for use in the system of the present invention.

Returning attention to FIG. 1, along with several of the other figures which have already been discussed, FIG. 1 is employed also to illustrate a typical single-line drawing operation, and in this context, pen 14a is shown in the figure as having been moved from position 14A along a wavy line 50 to a terminal position shown at 14B. Terminal points 14A, 14B are indicated by dash-dot lines in FIG. 3, which lines also bear the designator 14c to indicate the location of the pen's longitudinal axis. Assuming that pen 14 is in the position relative to writing-surface area 12a as shown in FIG. 4, line 50 has the width $T_1$ and code structure 46 intersects scanning zone 38 as indicated in FIG. 4. In general terms, and as will now be more fully explained, with system 10 operating, movement of the pen in the fashion just described is noted by transceiver structures 18, 20, whose photodetectors transmit to processor 40 signals in the form of pulses relating to retroreflection activity, which pulses are interpretable by the processor to track the position and motion of the pen, as well as to identify the character, color and inclination of the pen.

Figure 6:
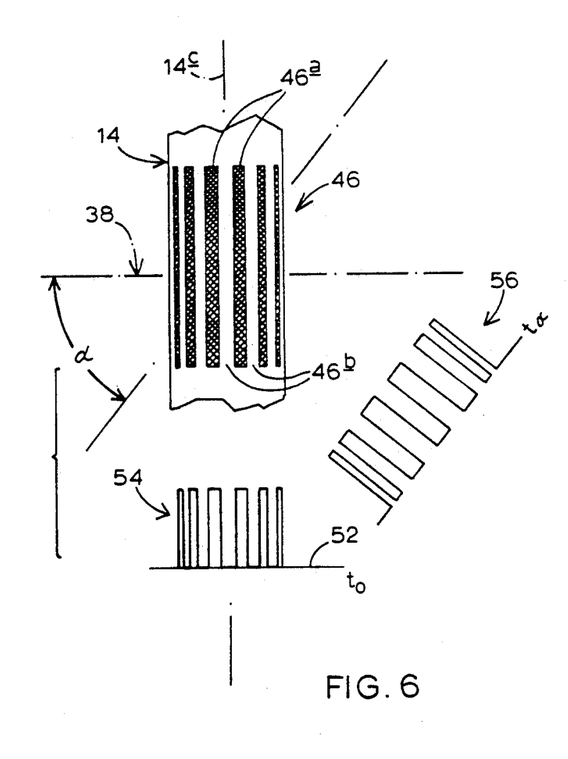
FIG. 6 is an enlarged, fragmentary, schematic detail relating to FIGS. 4 and 5, illustrating one form of a linear, light-reflecting bar code (code structure) on the writing implement depicted in FIGS. 4 and 5, and showing, in relation thereto, pulse trains that are indicative of scan reflections received by a transceiver structure in the system in relation to the two "writing angles" depicted in FIGS. 4 and 5.
Figure 7:
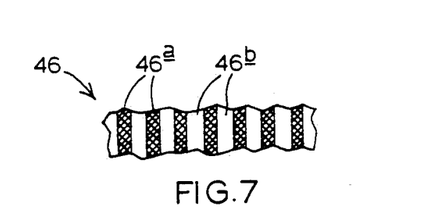
FIG. 7 is a developed, schematic strip drawing illustrating a bar code like that shown in FIG. 6.

Looking at FIG. 6, the body of pen 14 is here fragmentarily shown upright in the drawing relative to a horizontal surface 52 which can be thought of either as representing, or as being coincident with, writing-surface area 12a. Given the nature of the differentiated retroreflecting bars or bar regions that make up code structure 46, and their dispositions relative to the plane of scanning zone 38 as illustrated in FIG. 6, each transceiver structure in the system receives a retroreflection return which creates, on a time base, such as time base $t_0$, a string of pulses like those shown at 54 in FIG. 6. Processor 40 is equipped according to the invention, and by the utilization of conventional techniques, with a look-up table structure which enables it to identify, from this string of pulses, the operative nature (character, angular disposition, color, etc.) of pen 14. "Tracking" of the pen by both transceiver structures, an operation performed on the respective output signals by processor 40, to effect conventional triangulation procedures, enables the processor to "know" precisely where writing is occurring with motion of the pen. Thus, under the circumstances now being described, a data stream will be created on bus 44, which stream can be employed for feeding to remote stations, etc., to reflect accurately the drawing of line 50, with appropriate color and line width.

Had line 50 been created with pen 14 oriented nominally at an angle such as angle $\alpha$ (see FIG. 5) to the plane of writing-surface 12a, each of the two transceiver structures would receive a retroreflection response different from the other transceiver structure and different from the response which produced the chain of pulses illustrated at 54 in FIG. 6. For example, one such different chain of pulses 56 is illustrated along a time base $t_\alpha$ extending at an angle $\alpha$ relative to line 52 in FIG. 6. With regard to this activity, the output signals from the transceiver structures are processed by processor 40, in the sense of their being compared to the look-up table structure provided, from which the processor can develop an output data stream which now reflects the changed line width that has been drawn, as well as the issue of parallax (so that a remote station will be capable of recreating precisely the location and disposition of line 50).

The look-up table structure provided for the processor can be constructed to have any desired degree of "resolution" such that, for example, different "writing angles" within different subranges of an overall permissible maximum writing angle $\alpha$, in relation to the locations of the transceiver structures, are available for accurate determination of written-information location. As was mentioned, the creation of such tables is well within the skill of those experienced in this field of art.

Figure 11:
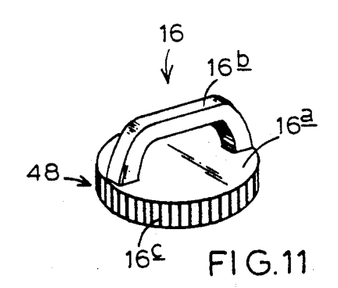
FIG. 11 is an isometric view of a preferred form of a free-standing eraser, having a round erasure expanse, employed in the system of FIG. 1.
Figure 12:
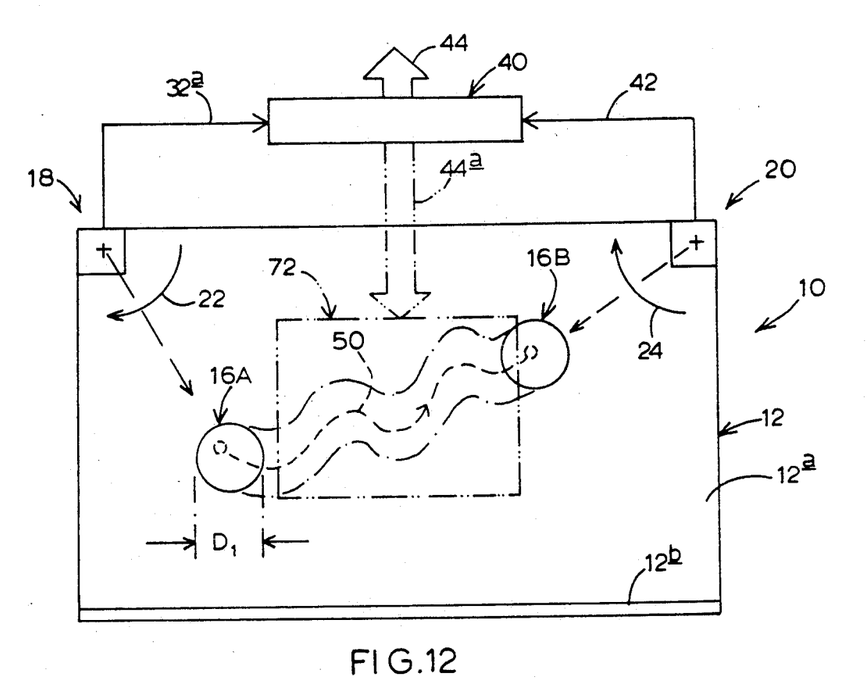
FIG. 12 (third plate of drawings) is similar to FIG. 1, with the exception that it illustrates use of the eraser of FIG. 11 to create a swath over the writing-surface area in the system, which swath removes the line created by the writing shown in the illustration of FIG. 1.

Directing attention now to FIGS. 11 and 12, FIG. 11 illustrates the preferred form of eraser 16 which includes a circular body 16a, a manipulation handle 16b which is joined to the top surface of body 16a, and a round, or circular, eraser pad expanse 16c joined to the underside of body 16a. Code structure 48 is a linearally distributed bar code having differentiated retroreflecting and non-retroreflecting bands (like those previously mentioned) formed on the perimeter of body 16a as shown. Processor 40 is equipped, in its look-up table structure, with information that specifically relates to code structure 48 vis-a-vis identifying that component 16 is an erasing instrumentality, and further identifying that it is circular in nature and that it has a certain diameter $D_1$ (see FIG. 12). Given this, and looking at a situation illustrated in FIG. 12, here, eraser 16 is illustrated as having been moved to create an eraser swath directly overlying, and thus removing, previously mentioned drawn line 50, with the eraser moving from a starting position 16A to an ending position at 16B. Transceiver structures 18, 20 track this activity and provide signals to processor 40 which signals indicate precisely what has occurred so that the processor can provide, via bus 44, a data stream which effects "erasure" of line 40 from the remote displays, or the like.

Figure 13:
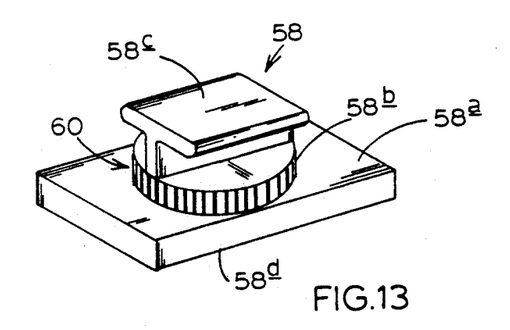
FIGS. 13, 14 and 15 (fragment only) illustrate isometrically three different modifications of free-standing erasers employable in the system of the invention.

FIG. 13 illustrates a modified form of eraser 58 which includes an oblong, rectangular body 58a, a cylindrical riser 58b whose perimeter carries a code structure 60, a manipulation handle 58c which is joined to riser 58b, and an oblong, rectangular erasure pad 58d that fits on the bottom of body 58a. Code structure 60 is constructed to have an appropriate angular variance, such as that illustrated in FIG. 9, so that the angular, rotational disposition of eraser 58, relative to the plane of writing-surface area 12a, can be determined, thus to indicate the nature (width) in real time of the erasure swath which is created by motion of eraser 58 over the writing-surface area.

Figure 14:
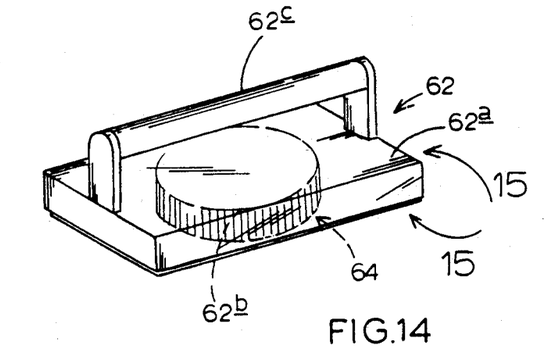

FIG. 14 illustrates yet another modified form of a free-standing eraser. Here there is shown at 62 an eraser which includes a hollow, oblong, rectangular body 62a whose side walls are formed of a suitable plastic material which is substantially transparent to the wavelength of radiation employed by transceiver structures 18, 20, and within which is located a cylindrical structure 62b whose perimeter carries a code structure 64 which is like previously mentioned code structure 60. Through the walls of the body, code structure 64 is able optically to interact with radiation in zone 38. Joined to body 62a is a manipulation handle 62c.

Figure 15:
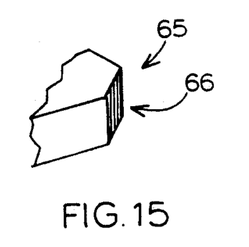

FIG. 15 illustrates, very fragmentarily, yet another modified form of free-standing, oblong, rectangular eraser, similar in some respects to erasers 58, 62, wherein the four corners of the body are "clipped" as illustrated at 65 to carry strips of code structure, such as the code structure illustrated at 66 in FIG. 15. With this kind of an arrangement, and with appropriate look-up table structure, processor 40 can determine not only the rotational position, relative to writing-surface area 12a, of an eraser so constructed, but also can tell whether such an eraser is tilted away from area 12a so that it is being held to erase, not across the broad expanse of its erasure pad, but rather along one of the linear edges of this expanse.

Figure 16:
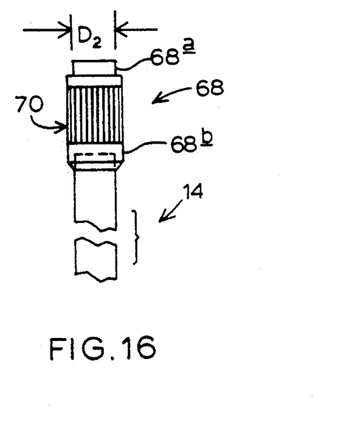
FIG. 16 (second plate of drawings) illustrates a modified form of round or circular eraser which snaps removably onto that end of the writing stylus shown in FIGS. 4 and 5 which is remote from the "writing end".

Moving along in this description, FIG. 16 (second plate of drawings) illustrates at 68 a small cylindrical eraser which is adapted to be snap-fitted onto the non-writing-tip end of the body of pen 14. This eraser includes a small circular erasure pad 68a having a diameter $D_2$ which is considerably smaller than the diameter $D_1$ of eraser 16. Eraser 68, on its cylindrical body 68b, carries a linear, retroreflecting bar-code structure 70. While this structure has been described herein as one that snap-fits onto the body of pen 14, it is possible of course that the pen can be constructed with such an eraser permanently in place.

In all of the descriptions so far, the system has been described in the context of one wherein a pen, such as pen 14, produces an actual mark on a writing-surface area, such as on writing-surface area 12a, and wherein an eraser, such as eraser 16, removes an actual mark. A modification can readily take the form of a system wherein the writing-surface area actually forms the front face of a translucent projection screen, with respect to which there is provided conventional back-projection equipment that responds to a data stream on bus 44 to project, or de-project, in real time, a light image which creates a virtual writing or drawing in response to motion of a "writing" and/or "erasing" component adjacent the writing-surface area. In FIG. 1, in dash-double-dot lines at 72, such a back-projection system is shown coupled through a data bus 44a to processor 40. FIG. 12 includes, in dash-double-dot lines, an illustration of the same modified system (performing during an erasure operation).

Accordingly, a unique graphic data-acquisition system, based on the use of implement-specific code structure which is passive on a write-effective component, has been disclosed. This system will be seen to offer all of the features and advantages that are made available in the various prior art systems mentioned earlier, and in addition to offer a number of new and important operational and characteristic advantages.

The preferred forms of the system have been described in conjunction with the use, on the so-called write-effective components, of a code structure which is formed from differentiated retroreflecting regions. Retroreflective structure could, if desired, be replaced by non-retroreflective, but nevertheless appropriately, generally reflective material. In a very simple application, the code structure could take the form of a single bar or band of reflecting material. In addition, other kinds of passive, scanning-reactive code structures could be used. For example, radiation scanned from the transceiver structures could be employed to excite a coded pattern of phosphor carried on a component, excitation of which phosphor could be picked up by appropriate photodetectors. In this case, such excitation would not properly be referred to as reflection activity, but rather more correctly as radiation-responsive activity. Another possibility is that radiation from the transceiver structures could excite a material which responds to the stimulating wavelength by emissions of a different one that could be picked up by suitable detectors. Still a further possibility is that transceiver radiation could excite a code material which responds by heating to some extent, and whose radiated/heated condition could be picked up by suitable infrared detectors. Other passive code-structure possibilities may be usable as well.

It desired to claim and secure by Letters Patent:
1. A graphic data-acquisition system for noting the character, and for tracking the positional status, relative to a defined writing-surface area, of a mobile write-effective component in the system comprising
    scanning light-beam-source structure disposed adjacent such writing-surface area and operable to create a defined pattern of scanned light within and covering a scanning zone spaced closely adjacent and generally spanning the writing-surface area,
    light-retroreflecting, selected-characteristic-identifying code structure joined to the mobile component for the retroreflection of light impinging the code structure within said scanning zone, including the retroreflection of encoded, characteristic-identifying information
    light-retroreflection monitoring structure positioned adjacent the writing-surface area for receiving such retroreflection, and for producing a signal related thereto, and
    interpretation structure operatively connected to said monitoring structure for acquiring and interpreting positional and component-characteristic-identifying information from such a produced signal.

2. The system of claim 1, wherein said component comprises an instrumentality for effecting writing on such writing-surface area.

3. The system of claim 1, wherein said writing-surface area is constructed as a part of a structure which permits imagery back projection, and said component comprises an instrumentality for writing by effecting such projection.

4. The system of claim 1, wherein said component comprises an instrumentality for effecting deleting of writing on such writing-surface area.

5. The system of claim 4, wherein said deleting instrumentality has a round deleting expanse.

6. The system of claims 1, 2, 3, 4 or 5, wherein said code structure take the form of a selected arrangement of differentiated-retroreflecting regions.

7. The system of claim 6, wherein said regions form a bar code.

8. The system of claim 7, wherein said regions are generally distributed unilinearly.

9. The system of claim 7, wherein said regions are generally distributed bilinearly.

10. The system of claim 6, wherein said code structure is distributed circumferentially on a generally cylindered surface linked with said component.

11. The system of claim 7, wherein said bar code is distributed circumferentially on a general cylindrical surface linked with said component.

12. The system of claim 11, wherein said bar code is distributed with angular uniformity on said cylindrical surface.

13. The system of claim 11, wherein said bar code is distributed with angular variance on said cylindrical surface.

14. The system of claim 6, wherein said regions, as viewed by said monitoring structure within said zone, appear differently, depending upon the angular disposition of said component relative to the writing-surface area, said monitoring structure's produced signal has features related to such angular-disposition appearance differences, and said interpretation structure is constructed to understand such signal features, thus to interpret properly the component's angular disposition relative to the writing-surface area.

15. The system of claims 1, 2, 3, 4 or 5, wherein said code structure is designed to indicate the functional nature of said component.

16. The system of claims 1, 2, 3, 4 or 5, wherein said code structure is designed to indicate aspects of said component's size and shape.

17. The system of claim 2, wherein said code structure is designed to indicate said instrumentality's writing color.

18. The system of claim 6, wherein said code structure is designed to indicate aspects of said component's size and shape.

19. The system of claim 1, wherein said component comprises an elongate instrumentality including, adjacent one end, a writing-tip region for effecting writing on such writing-surface area, said code structure is displaced longitudinally along the length of said component relative to said region, and said interpretation structure is designed, under circumstances with writing effection occurring with the long axis of said component disposed in a non-normal, angular relationship to the writing-surface area, to produce a positional interpretation regarding the component which corrects for parallax.

20. The system of claim 1, wherein said component comprises a writing instrumentality having a writing-tip region, changes in whose angular disposition relative to the writing-surface area create, during a write-effecting operation, related changes in the effective width of a written line, and said interpretation structure, in cooperation with said code structure and said monitoring structure, is designed to take such line-width considerations into account.

21. A graphic data-acquisition system for noting the character, and for tracking the positional status, relative to a defined writing-surface area, of a mobile writing instrument in the system comprising
scanning light-beam-source structure disposed adjacent such writing-surface area and operable to create a defined pattern of scanned light within and covering a scanning zone spaced closely adjacent and generally spanning the writing-surface area,
instrument-character-specific bar-code structure joined to said instrument for reflecting light impinging the instrument within said scanning zone,
light-reflection monitoring structure positioned adjacent the writing-surface area for receiving such reflection and for producing a writing-related signal associated therewith, and
interpretation structure operatively connected to said monitoring structure for acquiring and interpreting positional and component-characteristic-identifying information from such a produced signal.

22. The system of claim 21, wherein said bar-code structure takes the form of a selected arrangement of differentiated-reflecting regions.

23. A graphic data-acquisition system for noting the character, and for tracking the positional status, relative to a defined writing-surface area, of a mobile erasing instrument in the system comprising
scanning light-beam-source structure disposed adjacent such writing-surface area and operable to create a defined pattern of scanned light within and covering a scanning zone spaced closely adjacent and generally spanning the writing-surface area,
instrument-character-specific bar-code structure joined to said instrument for reflecting light impinging the instrument within said scanning zone,
light-reflection monitoring structure positioned adjacent the writing-surface area for receiving such reflection and for producing an erasing-related signal associated therewith, and
interpretation structure operatively connected to said monitoring structure for acquiring and interpreting positional and component-characteristic-identifying information from such a produced signal.

24. The system of claim 23, wherein said bar-code structure takes the form of a selected arrangement of differentiated-reflecting regions.

25. A graphic data-acquisition system for following the operational performance of a mobile write-effective component relative to a defined writing-surface area comprising
scanning light-beam-source structure disposed adjacent such writing-surface area and operable to create a defined pattern of scanned light within and covering a scanning zone spaced closely adjacent and generally spanning the writing-surface area,
component-specific, light-reflective bar-code structure joined to said component for reflecting light impinging the component within said scanning zone,
light-reflection monitoring structure positioned adjacent the writing-surface area for receiving such reflection and for producing a signal related thereto, and
interpretation structure operatively connected to said monitoring structure for receiving such a produced signal, and for acquiring therefrom operationalperformance-following information regarding said component.

26. An optically based, graphic data-acquisition system for tracking, in relation to a defined writing-surface area, the operational status of a mobile write-effective component in the system comprising active optical structure disposed adjacent such area for creating, closely adjacent and generally spanning the writing-surface area, a defined zone of optical radiation, optically reactive code structure joined to the mobile component and operable to react to such radiation with the code means in a condition optically engaging said zone, reaction monitoring structure positioned adjacent the writing-surface area for monitoring any such reactive behavior of said code structure, and for producing a response which is related to monitored, reactive behavior of the code structure, and interpretation structure operatively connected to said monitoring structure for acquiring from such a response operational-status-tracking information regarding said component.

27. An optically based, one-to-one, graphic data-acquisition system for tracking, in relation to a defined writing-surface area, the operational status of a mobile, write-effective component in the system comprising active optical transceiver structure disposed at a selected station adjacent such area for creating, closely adjacent and generally spanning the writing-surface area, a defined zone of optical radiation, and for monitoring, and generating a response related to any such radiation which is reflected from a location within said zone, optically reactive code structure joined to the mobile component for producing such reflection under circumstances with the code means optically engaging said zone, and interpretation structure operatively connected to said transceiver structure for acquiring from such a transceiver response operational-status-tracking information regarding said component.

28. A graphic data-acquisition system for tracking, in relation to a defined writing-surface area, the operational status of a mobile, write-effective component in the system comprising active electromagnetic-field transceiver structure disposed at a selected station adjacent such area for creating, closely adjacent and generally spanning the writing-surface area, a defined zone of electromagnetic-field radiation, and for generating a response related to the receipt from said zone of any return electromagnetic-field radiation which is specifically associated with such created radiation, passive electromagnetic-field code structure joined to the mobile component for producing such specifically associated return radiation under circumstances with the code structure field-electromagnetically engaging the zone, and interpretation structure operatively connected to said transceiver structure for acquiring from such a transceiver response operational-status-tracking information regarding said component.

* * * * *